United States Patent
Kamen et al.

(10) Patent No.: US 6,651,763 B1
(45) Date of Patent: Nov. 25, 2003

(54) TRANSPORTER OSCILLATING ALARM

(75) Inventors: Dean L. Kamen, Bedford, NH (US); Robert R. Ambrogi, Manchester, NH (US); J. Douglas Field, Bedford, NH (US); Burl Amsbury, Cambridge, MA (US)

(73) Assignee: Deka Products Limited Partnership, Manchester, NH (US)

(*) Notice: Subject to any disclaimer, the term of this patent is extended or adjusted under 35 U.S.C. 154(b) by 0 days.

(21) Appl. No.: 09/507,148

(22) Filed: Feb. 18, 2000

Related U.S. Application Data (63) Continuation-in-part of application No. 09/325,978, filed on Jun. 4, 1999, now Pat. No. 6,302,230.

(51) Int. Cl.$^7$ .......................... B60K 31/18; B60D 1/28; B60Q 1/00
(52) U.S. Cl. ................. 180/171; 180/271; 180/282; 180/285; 340/441
(58) Field of Search ................. 180/7.1, 8.2, 8.3, 180/271, 218, 209, 282, 274, 170, 171, 283; 280/5.507, 5.513; 340/438, 441

(56) References Cited

U.S. PATENT DOCUMENTS

| | | | | |
|---|---|---|---|---|
| 3,967,862 A | * | 7/1976 | Hunter et al. | 180/197 |
| 4,613,153 A | * | 9/1986 | Shibahata et al. | 280/5.507 |
| 4,790,522 A | * | 12/1988 | Drutchas | 280/5.507 |
| 4,848,790 A | * | 7/1989 | Fukunaga et al. | 280/5.507 |
| 5,922,039 A | * | 7/1999 | Welch et al. | 280/5.507 |
| 6,076,027 A | * | 6/2000 | Raad et al. | 280/5.507 |

FOREIGN PATENT DOCUMENTS

| | | |
|---|---|---|
| JP | 6-105415 | 12/1989 |
| JP | 4-201793 | 7/1992 |
| WO | WO 96/23478 | 8/1996 |

OTHER PUBLICATIONS

Kanoh, *Adaptive Control of Inverted Pendulum*, Computrol, vol. 2, pp. 69–75 (1983).

Yamafuji, *A Proposal for Modular–Structured Mobile Robots for Work that Principally Involve a Vehicle with Two Parallel Wheels*, Automation Technology, vol. 20, pp. 113–118 (1988).

Yamafuji & Kawamura, *Study of Postural and Driving Control of Coaxial Bicycle*, Paper Read at Meeting of Japan Society of Mechanical Engineering (Series C), vol. 54, No. 501, pp. 1114–1121 (May, 1988).

Yamafuji et al., *Synchronous Steering Control of a Parallel Bicycle*, Paper Read at Meeting of Japan Society of Mechanical Engineering (Series C), vol. 55, No. 513, pp. 1229–1234 (May, 1989).

Momoi & Yamafuji, *Motion control of the Paralell Bicycle–Type Mobile Robot Composed of a Triple Inverted Pendulum*, Paper Read at Meeting of Japan Society of Mechanical Engineering (Series C), vol. 57, No. 541, pp. 154–159 (Sep., 1991).

* cited by examiner

Primary Examiner—Lesley D. Morris
Assistant Examiner—Matthew Luby
(74) Attorney, Agent, or Firm—Bromberg & Sunstein LLP (57) ABSTRACT

A vehicle capable of an extraordinary mode of motorized motion programmed to draw the attention of an operator. When one or more sensors sense a condition requiring attention of the operator, an oscillatory motion is superposed upon the motion of the ground-contacting members.

7 Claims, 7 Drawing Sheets

TRANSPORTER OSCILLATING ALARM

The present application is a continuation-in-part of application, U.S. Ser. No. 09/325,978, filed Jun. 4, 1999, now U.S. Pat. No. 6,302,230, which is hereby incorporated by reference.

TECHNICAL FIELD

The present invention pertains to a vehicle that alerts an operator of the vehicle to a specified operational condition by causing a perceptible shaking motion of the vehicle.

BACKGROUND ART

A wide range of vehicles and methods are known for transporting human subjects. It is well known that circumstances arise under which it is useful or even critical that the operator of the vehicle be alerted to the occurrence of a particular state (such as engine failure, for example) or to the desirability of a particular course of action ('fasten seat belt').

Sometimes, because of the disability or lack of concentration of the operator, a visual or auditory warning or alert may be ineffectual. Tactile alarms are known in the art where a small vibrator is placed against the skin of the rider. In traveling over rough terrain, however, the rider may not notice the small vibrations against his/her skin. In addition, such an alarm must typically be attached to the rider's body in order for it to work.

SUMMARY OF THE INVENTION

In accordance with preferred embodiments of the present invention, there is provided a vehicle for carrying a user. The vehicle has a ground-contacting module which supports a payload including the user and which contacts an underlying surface by means of at least one ground-contacting member. The vehicle also has a motorized drive for actuating the at least one ground-contacting member so as to propel the vehicle in a normal mode of locomotion. A sensor is provided for sensing a specified condition of the vehicle, as is a controller for causing the vehicle, in response to the specified condition, to be propelled in an extraordinary mode of locomotion.

In accordance with another aspect of the present invention, an alarm system is provided for alerting the operator of a vehicle having a motorized drive. The alarm system has a sensor for sensing a specified condition of the vehicle and a controller for causing the vehicle, in response to the specified condition, to be propelled in an extraordinary mode of locomotion. The controller may include a shaker that modulates acceleration of the vehicle. The vehicle may include a control loop in which a motorized drive is included, for propelling the vehicle is a condition of dynamic balance with respect to tipping in the fore-aft plane.

In accordance with further embodiments of the invention, the controller may provide an input to the control loop upon occurrence of a triggering condition, the input having a periodic factor. The controller may cause modulated acceleration of the vehicle. The ground-contacting module may include two laterally disposed wheels, and the vehicle may further include a control loop in which the motorized drive is included, for propelling the vehicle is a condition of dynamic balance with respect to tipping in the fore-aft plane. The controller may provide an input to the control loop upon occurrence of a triggering condition, the input having a periodic factor and a multiplicative coefficient.

In accordance with further alternate embodiments of the invention, the input may contribute differentially to a torque applied to a left wheel and a torque applied to a right wheel. The triggering condition may include at least one of low battery power, a specified vehicle speed, and receipt by the controller of conflicting values from redundant subsystems.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

The subject matter of this application is particularly suited for application to a balancing personal transporter such as that described in U.S. Pat. No. 5,971,091, issued Oct. 26, 1999, which is incorporated herein by reference in its entirety. In a balancing vehicle, dynamic stability may be maintained by action of the user, as in the case of a bicycle or motorcycle or scooter, or by a control loop, as in the case of the human transporter described in U.S. Pat. No. 5,701,965, also incorporated herein by reference.

The invention may be implemented in a wide range of embodiments. A characteristic of many of these embodiments is the use of the vehicle propulsion plant to impart a vibratory motion to the vehicle so as to alert the rider to a condition or to an action that should be taken. The ground or other surface, such as a floor, over which a vehicle in accordance with the invention is employed may be referred to generally herein as the "ground." The ground-contacting members are typically motor-driven. In many embodiments, the configuration in which the subject is suspended during locomotion lacks inherent stability at least a portion of the time with respect to a vertical in the fore-aft plane but is relatively stable with respect to a vertical in the lateral plane.

Figure 1:
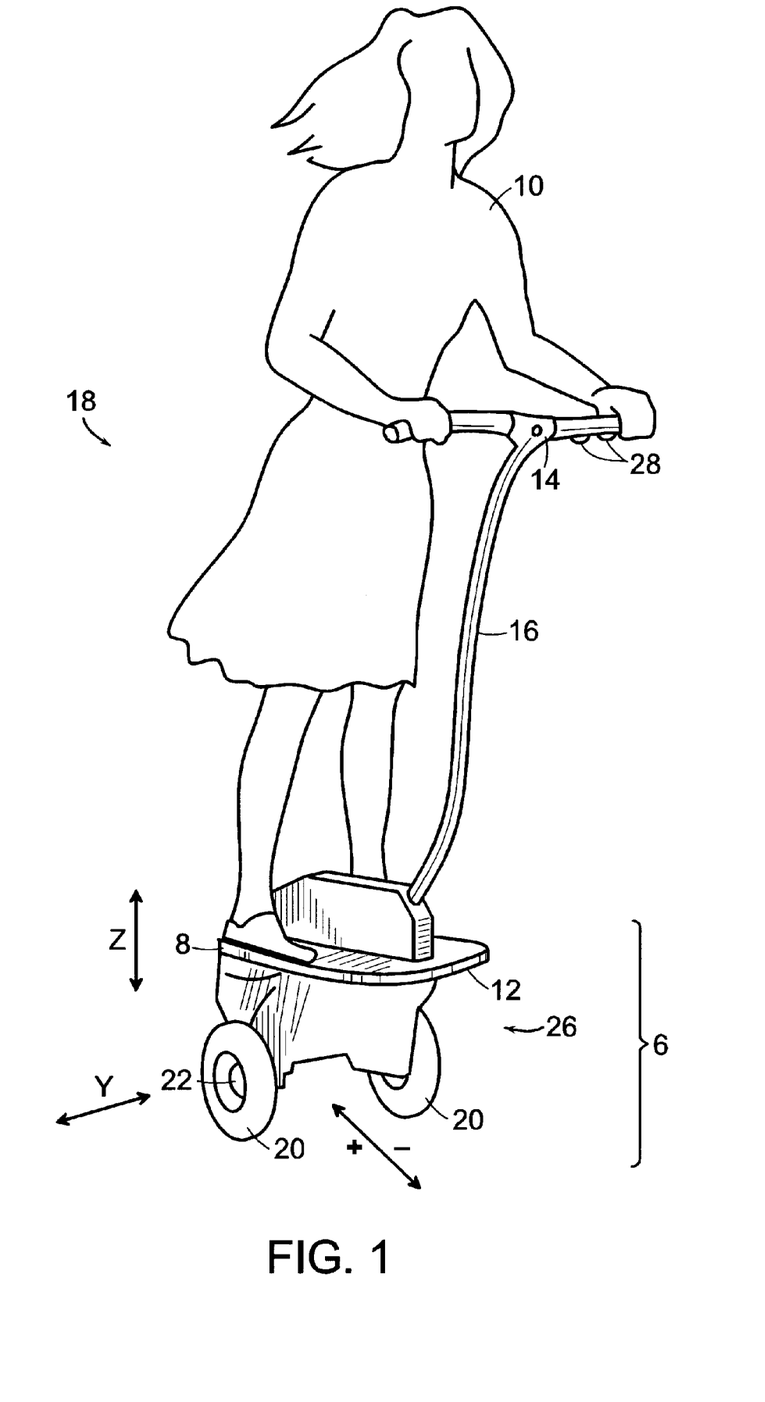
FIG. 1 is a side view of a personal vehicle lacking a stable static position, in accordance with a preferred embodiment of the present invention, for supporting or conveying a subject who remains in a standing position thereon.

FIG. 1 shows a prior art personal transporter, designated generally by numeral 18, that lacks static stability and that balances during the course of ordinary operation. A subject 10 stands on a support platform 12 and holds a grip 14 on a handle 16 attached to the platform 12, so that vehicle 18 may be operated in a manner analogous to a scooter. A control loop may be provided so that leaning of the subject results in the application of torque to wheel 20 about axle 22 thereby causing an acceleration of the vehicle. Vehicle 18 may have one or more yaw controls 28, such as a thumb-wheel or thumb dial, for example, to enable subject 10 to steer the vehicle about a vertical axis z perpendicular to the plane defined by the direction of motion x and a transverse axis y. A transporter such as transporter 18 may advantageously be used as a mobile work platform or a recreational vehicle such as a golf cart, or as a delivery vehicle.

Some embodiments of the invention may invoke the concept of primary wheels. The term "primary wheels," as used in this description and in any appended claims, refers to a minimum set of a vehicle's wheels on which the vehicle is capable of operating stably. More generally, the term "primary ground-contacting members" allows for a more general class of members, that includes but is not limited to wheels. Hence, as used in this description and in any appended claims, "primary ground-contacting members" refers to a minimum set of a vehicle's ground-contacting members on which the vehicle is capable of operating stably. Other ground-contacting members may include, without limitation: arcuate sections of a wheel, clusters of wheels, treads, etc.

In various embodiments of the invention, fore-aft stability may be achieved by providing a control loop, in which one or more motors are included, for operation of a motorized drive in connection with the ground-contacting members. Ground-contacting members may, for example, include a pair of wheels, or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain, when the vehicle is not in locomotion, the center of mass of the vehicle above the region of contact of the ground-contacting members with the ground, regardless of disturbances and forces operative on the vehicle.

A ground-contacting member typically has a "point" (actually, a region) of contact or tangency with the surface over which the vehicle is traveling or standing. Due to the compliance of the ground-contacting member, the "point" of contact is actually an area, where the region of contact may also be referred to as a contact patch. The weight of the vehicle is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

Operation of the balancing transporter will be described with reference to the set of coordinate axes shown in FIG. 1. Gravity defines the vertical axis z, while the axis coincident with the wheel axis 22 may be used to define a lateral axis y, and a fore-aft axis x is defined by the forward direction of motion of the vehicle. The plane defined by the vertical axis z and the lateral axis y will sometimes be referred to as the "lateral plane", and the plane defined by the fore-aft axis x and the vertical axis z will sometimes be referred to as the "fore-aft plane". Directions parallel to the axes x and y are called the fore-aft and lateral directions respectively. It can be seen that the vehicle, when relying on the pair of wheels 20 for contacting the ground, is inherently unstable with respect to a vertical in the fore-aft direction, but is relatively stable with respect to a vertical in the lateral direction. In other embodiments of the invention described below, the vehicle may also be unstable with respect to yaw about the x axis.

Figure 2:
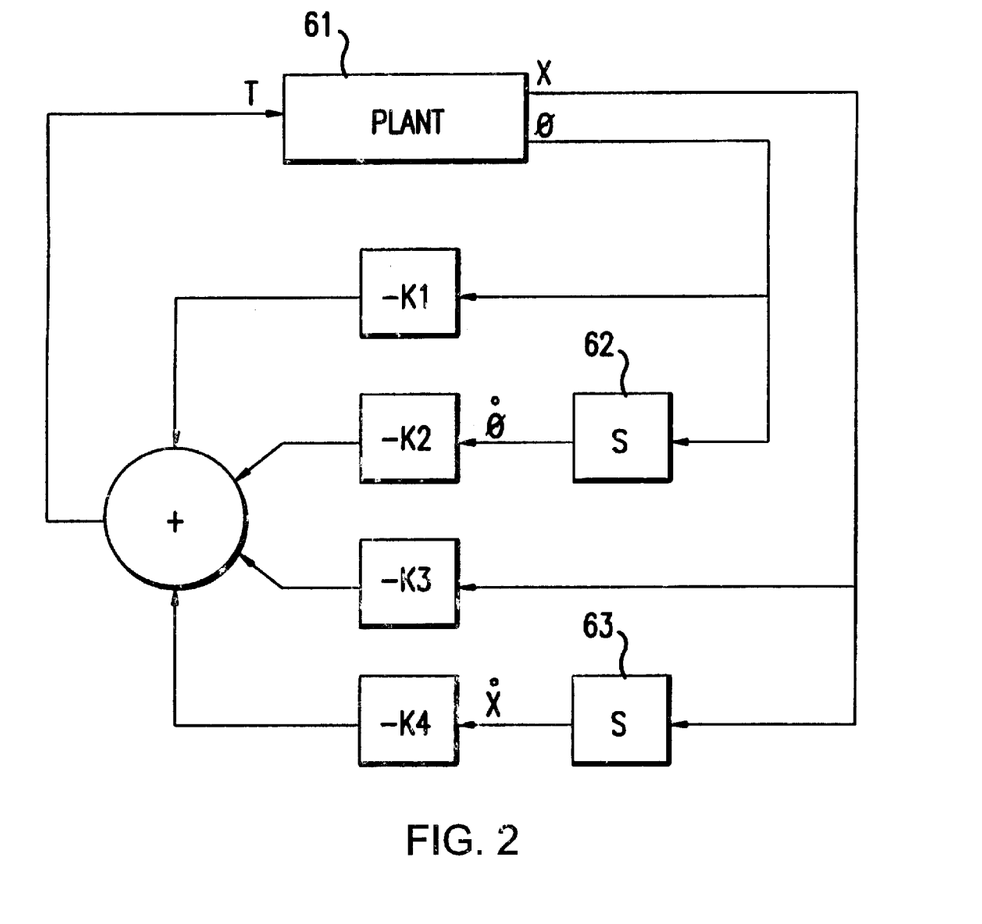
FIG. 2 illustrates the control strategy for a simplified version of FIG. 1 to achieve balance using wheel torque.
Figure 3:
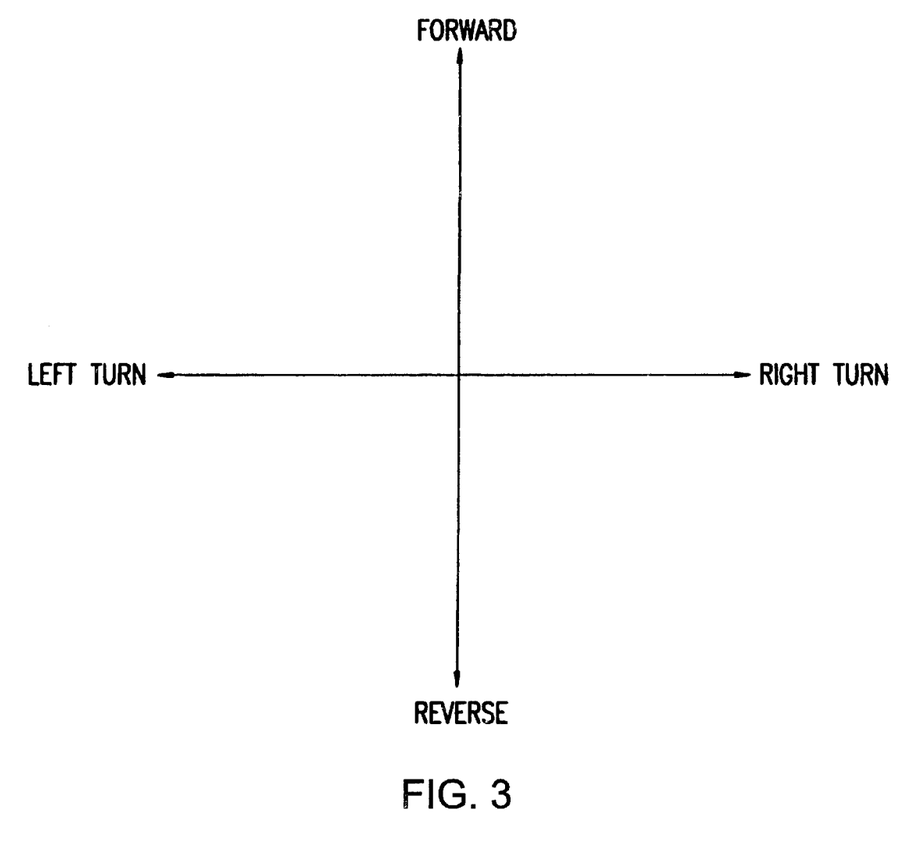
FIG. 3 illustrates diagrammatically the operation of joystick control of the wheels of the embodiment of FIG. 1.

A simplified control algorithm for achieving balance in the embodiment of the invention according to FIG. 1 when the wheels are active for locomotion is shown in the block diagram of FIG. 2. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta + \theta_0) + K_2 \dot{\theta} + K_3(x + x_0) + K_4 \dot{x}, \quad \text{(Eqn. 1)}$$

where:

T denotes a torque applied to a ground-contacting element about its axis of rotation;

$\theta$ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a subscripted variable denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 3 maintains balance and also proximity to the reference point on the surface in the presence of disturbances such as changes to the system's center of mass with respect to the reference point on the surface due to body motion of the subject or contact with other persons or objects.

The effect of $\theta_0$ in the above control equation (Eqn. 1) is to produce a specified offset $-\theta_0$ from the non-pitched position where $\theta=0$. Adjustment of $\theta_0$ will adjust the vehicle's offset from a non-pitched position. As discussed in further detail below, in various embodiments, pitch offset may be adjusted by the user, for example, by means of a thumb wheel 32, shown in FIG. 1. Ant adjustable pitch offset is useful under a variety of circumstances. For example, when operating the vehicle on an incline, it maybe desirable for the operator to stand erect with respect to gravity when the vehicle is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

The size of $K_3$ will determine the extent to which the vehicle will seek to return to a given location. With a non-zero $K_3$, the effect of $x_0$ is to produce a specified offset $-x_0$ from the fiducial reference by which x is measured.

When $K_3$ is zero, the vehicle has no bias to return to a given location. The consequence of this is that if the vehicle is caused to lean in a forward direction, the vehicle will move in a forward direction, thereby maintaining balance. Such a configuration is discussed further below.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the vehicle is moving.

"Stability", as used in this description and in any appended claims refers to the mechanical condition of an operating position with respect to which the system will naturally return if the system is perturbed away from the operating position in any respect.

In order to accommodate two wheels instead of the one-wheel system illustrated for simplicity in FIG. 2, separate motors may be provided for left and right wheels of the vehicle and the torque desired from the left motor and the torque desired from the right motor can be calculated separately in the general manner described below in connection with FIG. 6. Additionally, tracking both the left wheel motion and the right wheel motion permits adjustments to be made to prevent unwanted turning of the vehicle and to account for performance variations between the two drive motors.

In cases where gain $K_3$ is zero, a user control input such as a joystick may be used to adjust the torques of each motor. The joystick has axes indicated in FIG. 3. In operation of this embodiment, forward motion of the joystick is used to cause forward motion of the vehicle, and reverse motion of the joystick causes backward motion of the vehicle. A left turn similarly is accomplished by leftward motion of the joystick. For a right turn, the joystick is moved to the right. The configuration used here permits the vehicle to turn in place when the joystick is moved to the left or to the right, by causing rotation of left and right motors, and hence left and right wheels, at equal rates in opposite senses of rotation. With respect to forward and reverse motion an alternative to the joystick is simply leaning forward or backward (in a case where $K_3$ is zero), since the pitch sensor (measuring θ) would identify a pitch change that the system would respond to, leading to forward or reverse motion, depending on the direction of lean. Alternatively, control strategies based on fuzzy logic can be implemented.

It can be seen that the approach of adjusting motor torques permits fore-aft stability to be achieved without the necessity of additional stabilizing wheels or struts (although such aids to stability may also be provided). In other words, stability is achieved dynamically, by motion of the components of the vehicle (in this case constituting the entire vehicle) relative to the ground.

In accordance with preferred embodiments of the present invention, a tactile alarm is provided that modifies the behavior of the transporter such that the rider cannot miss the signal yet balanced locomotion is maintained. This is done by placing the transporter in an extraordinary mode of operation, such as by adding a small oscillating signal to each wheel motor command. The small oscillation appears to the rider as a shaking motion that will capture the attention of the rider and prompt the rider to notice an impending fault condition and take remedial steps prior to failure.

Figure 4:
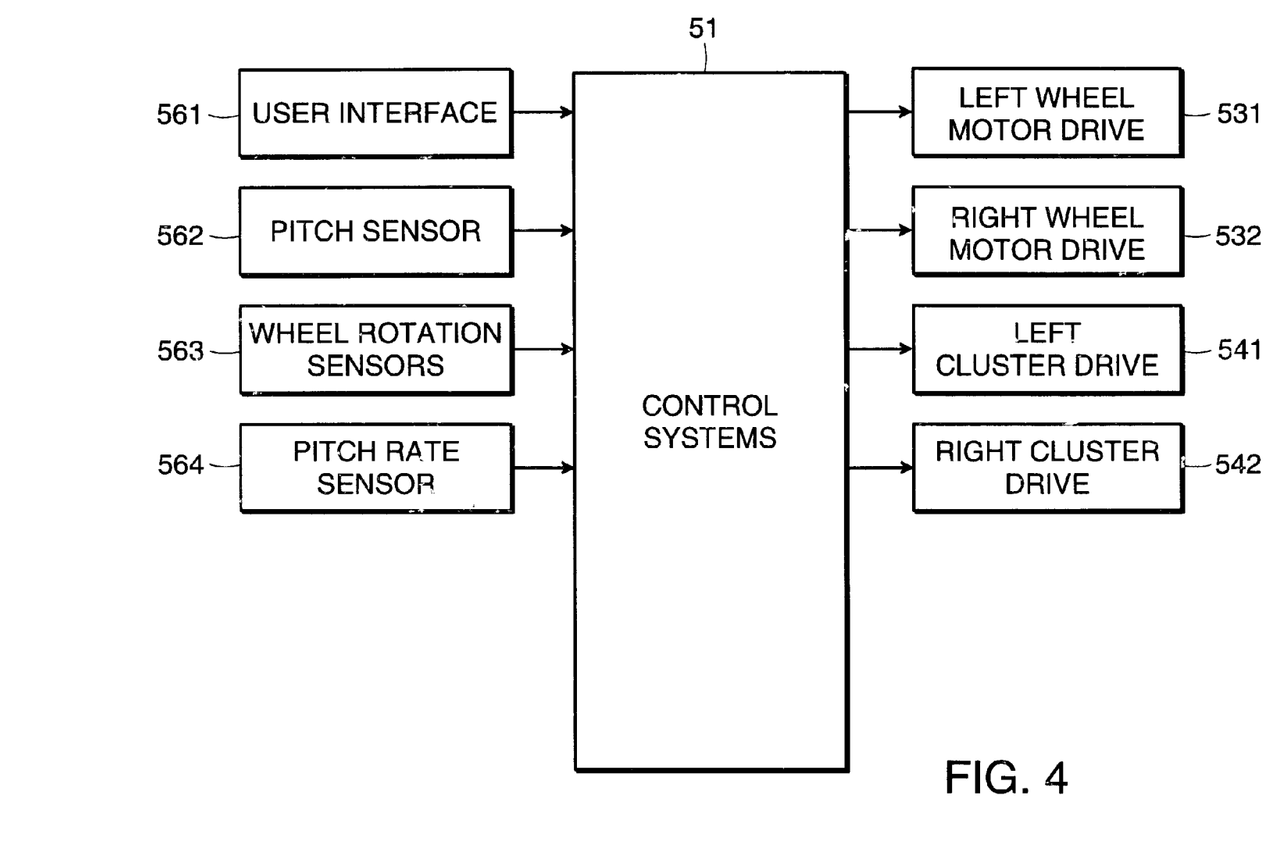
FIG. 4 is a block diagram showing generally the nature of sensors, power and control with the embodiment of FIG. 1.

In the block diagram of FIG. 4 it can be seen that a control system 51 is used to control the motor drives and actuators of the embodiment of FIG. 1 to achieve locomotion and balance. These include motor drives 531 and 532 for left and right wheels respectively. If clusters of wheels are present, as they may be in accordance with alternate embodiments of the invention, actuators 541 and 542 are provided for left and right clusters respectively. The control system has data inputs including user interface 561, pitch sensor 562 for sensing fore-aft pitch, and wheel rotation sensors 563, and pitch rate sensor 564. Pitch rate and pitch may be derived through the use of gyroscopes or inclinometers, for example, alone or in combination.

A grip 14 (shown in FIG. 1) may be conveniently provided with one or more thumb wheels 28 (shown in FIG. 1) or thumb-operated joystick for directional control, although other methods of control may also be used. Thumb wheels 28 may serve multiple control purposes. Alternatively, in accordance with other embodiments of the invention, handle 16 and grip 14 may be absent altogether, and the platform 12 may be equipped with sensors, such as forceplate 8, for example, to detect leaning of the subject. Indeed, as described herein, the pitch of the vehicle is sensed and may be used to govern operation of the control loop, so that if the subject leans forward, the vehicle will move forward to maintain a desired velocity or to provide desired acceleration. Accordingly, a forward lean of the subject will cause the vehicle to pitch forward and produce forward movement; a backward lean will cause the vehicle to pitch backward and produce backward movement. Appropriate force transducers may be provided to sense leftward and rightward leaning and related controls provided to cause left and right turning as a result of the sensed leaning.

Leaning may also be detected using proximity sensors. Additionally, operation of the vehicle may be governed on the basis of the orientation of the user with respect to the platform.

Figure 5:
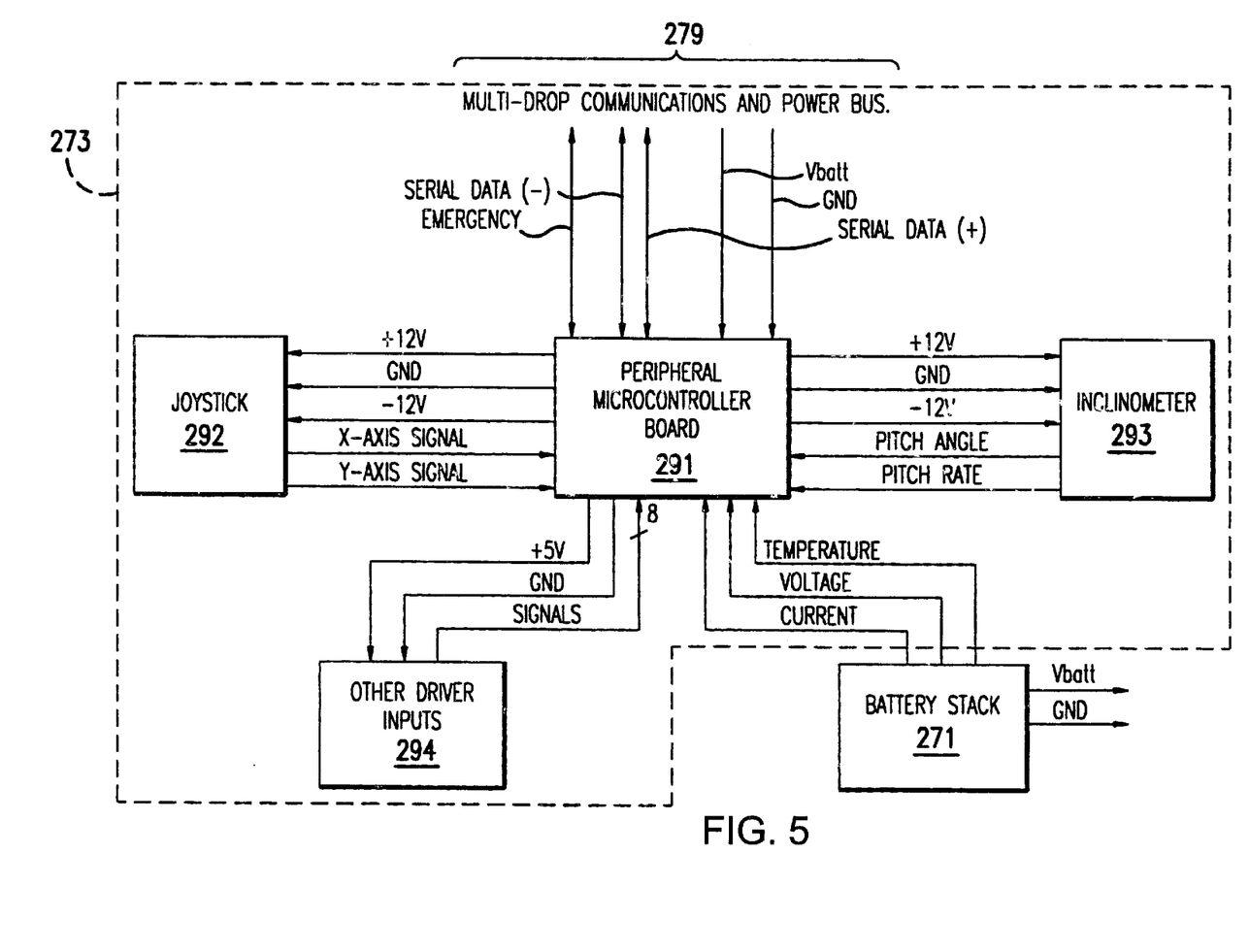
FIG. 5 is a block diagram providing detail of a driver interface assembly.

FIG. 5 is a block diagram providing detail of a driver interface assembly 273. A peripheral microcomputer board 291 receives an input from joystick 292, or, alternatively, from a thumbwheel, as well as from inclinometer 293 or another tilt-determining arrangement. The inclinometer provides information signals as to pitch and pitch rate. (The term "inclinometer" as used in this context throughout this description and in the accompanying claims means any device providing an output indicative of pitch or pitch rate, regardless of the arrangement used to achieve the output; if only one of the pitch and pitch rate variables is provided as an output, the other variable can be obtained by suitable differentiation or integration with respect to time.) To permit controlled banking into turns by the vehicle (thereby to increase stability while turning) it is also feasible to utilize a second inclinometer to provide information as to roll and roll rate or, alternatively, the resultant of system weight and centrifugal force. Other inputs 294 may also be desirably provided as an input to the peripheral micro controller board 291. Such other inputs may include signals gated by switches (knobs and buttons) for platform adjustment and for determining the mode of operation. The peripheral micro controller board 291 also has inputs for receiving signals from the battery stack 271 as to battery voltage, battery current, and battery temperature. The peripheral micro controller board 291 is in communication over bus 279 with a central micro controller board that may be used to control the wheel motors as described below in connection with FIG. 6.

Figure 6:
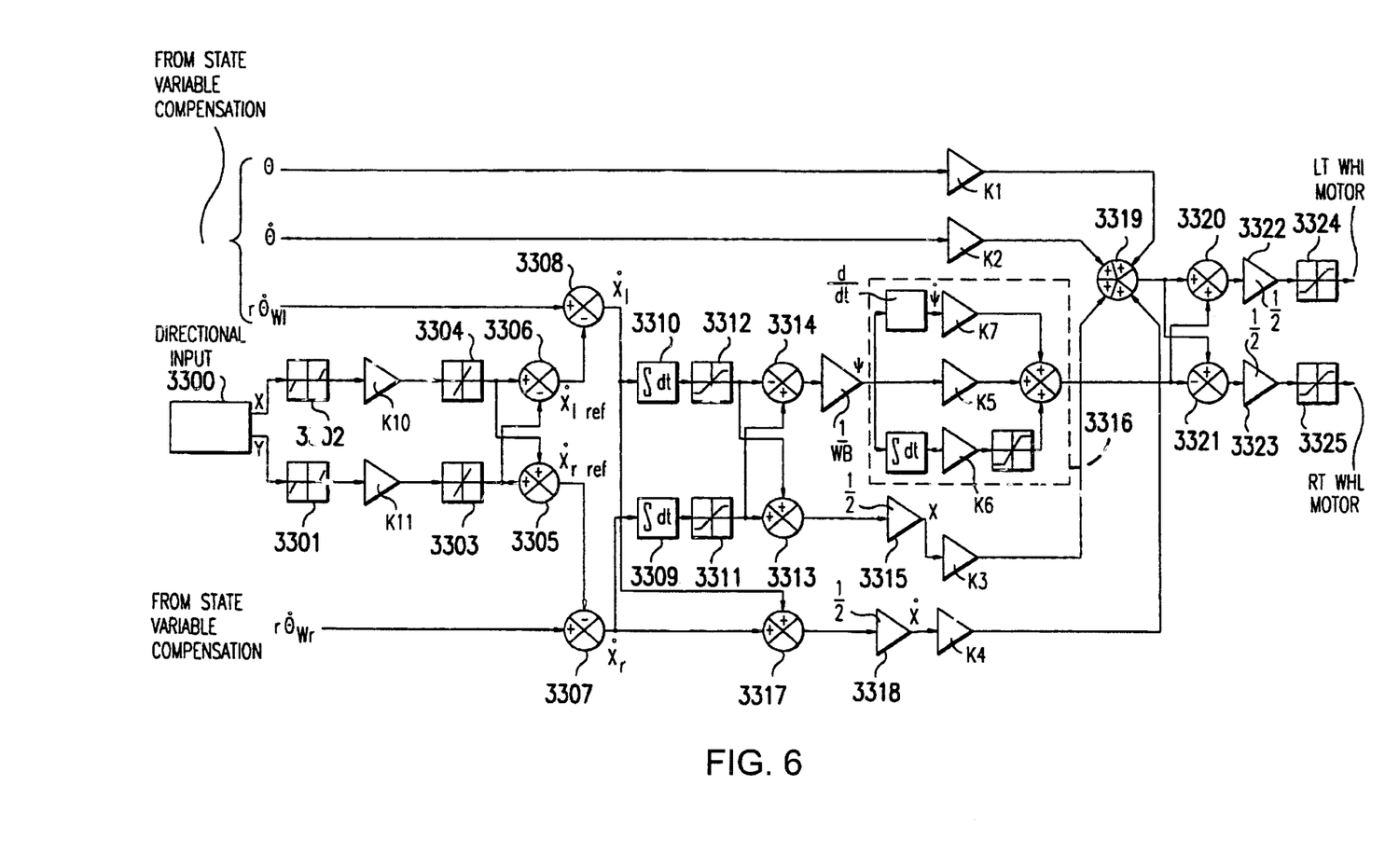
FIG. 6 is a schematic of the wheel motor control during balancing and normal locomotion, in accordance with an embodiment of the present invention.

FIG. 6 is a block diagram showing control algorithms suitable for use in conjunction with the control assemblies of FIG. 5 to provide stability for a vehicle according to the embodiment of FIG. 1 and other embodiments in which the vehicle and payload are balanced on two ground-contacting members, both during locomotion and in a fixed position. The following conventions are used in connection with the description below:

1. Variables defined in world coordinates are named using a single subscript in capital letters. World coordinates are coordinates fixed to the earth (inertial).

2. A non-subscripted r identifies a wheel radius.

3. Lower case subscripts are used to indicate other attributes, e.g., right/left, etc.: r=right; l=left; ref=reference; f=finish; s=start.

4. All angles are positive in the clockwise direction, where positive travel is in the positive x direction.

5. A dot over a variable indicates differentiation in time, e.g., $\dot{\theta}$.

FIG. 6 shows the control arrangement for the motors of the right and left wheels. The arrangement has inputs of $\theta$, $\dot{\theta}$, $r\dot{\theta}_{wl}$ (linear velocity of the left wheel relative to the world coordinate system) and $r\dot{\theta}_{wr}$ (linear velocity of the right wheel), in addition to directional inputs 3300 determined by joystick position along X and Y axes of a reference coordinate system. Inputs $\theta$, $\dot{\theta}$, and error signals x and $\dot{x}$ (described below), subject to gains $K_1$, $K_2$, $K_3$, and $K_4$ respectively, become inputs to summer 3319, which produces the basic balancing torque command for the wheels, in the general manner described above in connection with FIG. 2 above. The output of summer 3319 is combined with the output of yaw PID loop 3316 (described below) in summer 3320, then divided in divider 3322 and limited in saturation limiter 3324, to produce the left wheel torque command. Similarly, the output of summer 3319 is combined with the output of PID loop 3316 in summer 3321, then divided in divider 3323 and limited in saturation limiter 3325, to produce the right wheel torque command.

In FIG. 6, a directional input along the X axis moves the reference coordinate system along its X axis relative to the world coordinate system (which represents the traveled surface), at a velocity proportional to the displacement of the joystick. A directional input along the Y axis rotates the reference coordinate system about its Z axis at an angular velocity proportional to the displacement of the joystick. It will be appreciated that motion of the joystick in the positive X direction is here interpreted to mean forward motion; motion of the joystick in the negative X direction means reverse motion. Similarly, motion of the joystick in the positive Y direction means leftward turning, counter-clockwise as viewed from above; motion of the joystick in the negative Y direction means rightward turning clockwise as viewed from above. As noted above, a thumbwheel may also be employed as a user input with respect to turning commands.

Directional inputs Y and X are given deadband via deadband blocks 3301 and 3302 respectively, to widen the neutral position of the joystick, then subject to gains K11 and K10, then rate limited by limiters 3303 and 3304 respectively, which limit the angular and linear accelerations respectively of the reference coordinate system. The sum of these outputs achieved through summer 3305 becomes the reference velocity $\dot{x}_{r\ ref}$ whereas the difference of these outputs achieved through summer 3306 becomes the reference velocity $\dot{x}_{l\ ref}$. These reference velocities are subtracted in summers 3308 and 3307 from compensated linear velocity input signals $r\dot{\theta}_{wl}$ and $r\dot{\theta}_{wr}$ for left and right wheels to obtain velocity error signals $\dot{x}_l$ and $\dot{x}_r$ for left and right wheels within the reference coordinate system. In turn the average of these signals, determined via summer 3317 and divider 3318, produces a linear velocity error signal $\dot{x}$. Displacement error signal x is derived by integrating $r\dot{\theta}_{wl}$ and $r\dot{\theta}_{wr}$ in integrators 3310 and 3309, limiting the results in saturation limiters 3312 and 3311, and then averaging their outputs via summer 3313 and divider 3315. The difference between these displacements, determined via summer 3314, produces the yaw error signal $\psi$.

The yaw error signal $\psi$ is run through a standard proportional-plus-integral-plus-derivative (PID) control loop 3316, the output of which is combined with the output of the basic balancing torque command of summer 3319, to produce the individual wheel torque commands, which cause the wheels to maintain fore-aft stability and also cause the vehicle to align itself with the axes of, and follow the origin of, the reference coordinate system as directed by directional input 3300.

Figure 7:
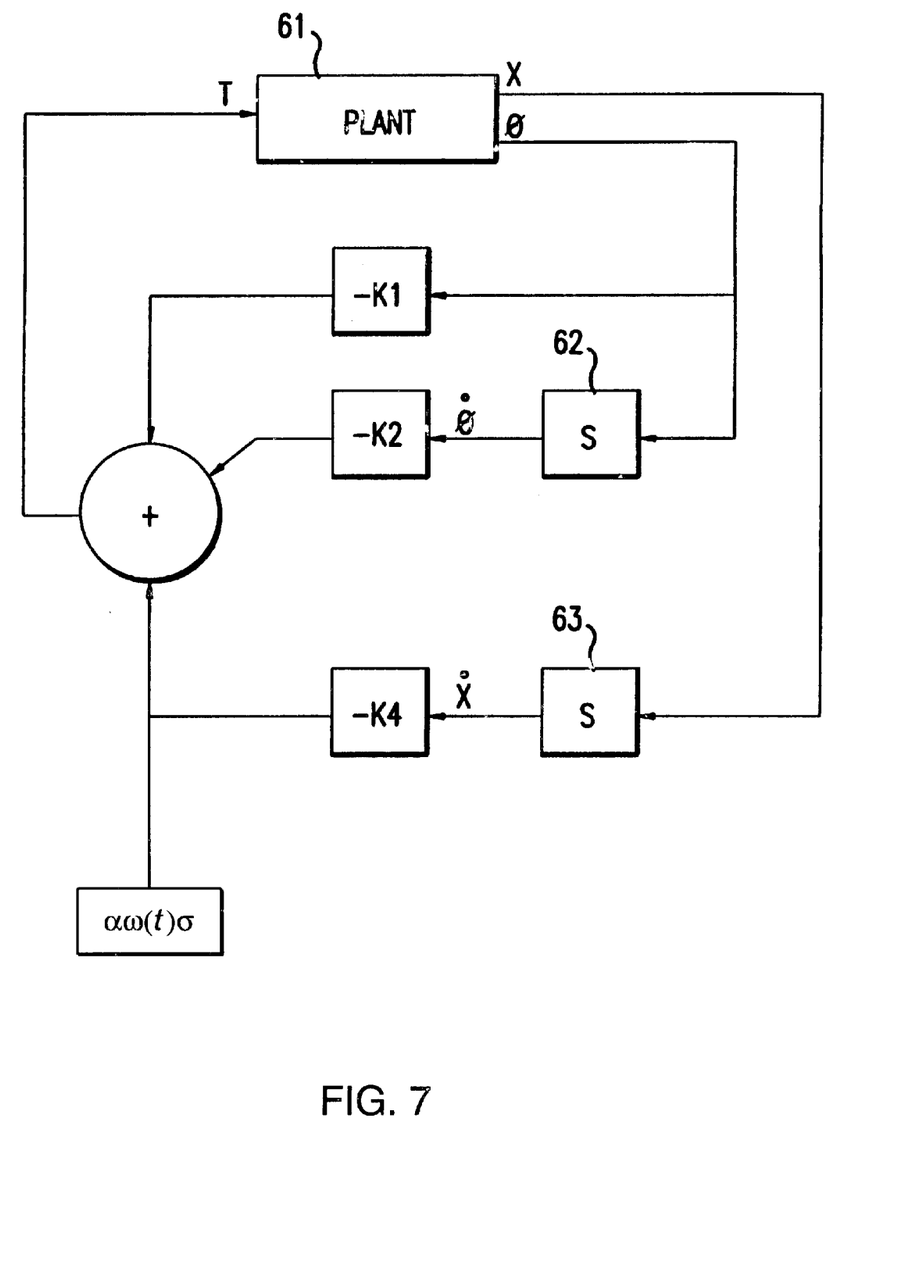
FIG. 7 illustrates the control strategy for a simplified version of FIG. 1 to achieve balance using wheel torque; in accordance with an embodiment of the present invention.

Referring now to FIG. 7, and restricting consideration to the case where $K_3$ of Eqn. 1 is identically zero, a control law used by the controller to command the wheel motor for the present invention is given as:

$$V_{right} = K_1(\theta) + K_2\dot{\theta} + K_4\dot{x}_{right} + \alpha\omega(t)\sigma, \quad \text{(Eqn. 2a)}$$

$$V_{left} = K_1(\theta) + K_2\dot{\theta} + K_4\dot{x}_{left} + \beta a\omega(t)\sigma. \quad \text{(Eqn. 2b)}$$

In equations 2a and 2b above, $V_{Right}$ represents the voltage command to the right wheel motor, $V_{Left}$ represents the voltage command to the left wheel motor, each voltage being substantially proportional to the torque applied to the respective wheel. Furthermore, $\theta$ represents the vehicle pitch error, $\dot{x}_{right}$ represents the right wheel velocity error, $\dot{x}_{left}$ represents the left wheel velocity error, and, as above, the $K_s$ represent the gains for each dynamic variable and the raised dot indicates the time derivative of the dynamic variable.

Referring now to the last term of each of Eqns. 2a and 2b, an oscillating function, $\omega(t)$, is multiplied by a trigger function, $\sigma$, and an amplitude, $\alpha$ and $\beta$, and added to the voltage command. The oscillating function, $\omega(t)$, may be any periodic or quasi-periodic function such as a sine function, square wave function, or triangle function. The frequency of oscillation may be in the range from 1 Hz to 60 Hz. In a preferred embodiment, the frequency is between 5 Hz and 10 Hz.

Amplitudes, $\alpha$ and $\beta$, may be constants or functions of the vehicle's dynamic state variables such as vehicle speed. In a preferred embodiment, $\alpha$ and $\beta$ are equal in magnitude but of opposite sign. The opposite signs of the amplitudes result in a zero net pitch contribution to the operating vehicle thereby minimizing extraneous pitch errors to the portion of the controller that performs the balancing algorithm and further thereby constituting a shaker. The magnitude of the amplitudes may be set to a constant or may be a function of vehicle speed such that, for example, the amplitude increases as the vehicle speed increases.

The trigger function, $\sigma$, may be a simple step function such that $\sigma$ is zero before a triggering event and non-zero after the triggering event. A triggering event may be any combination of the vehicle's state variables indicating an impending or existing vehicle fault state that requires the rider's attention. For example, the triggering event may be based on battery voltage or remaining battery power to alert the rider of low battery power. Another triggering event may be based on battery temperature to indicate overheating of the battery. Similarly, the triggering event may be based on motor temperature to indicate overheating of the motor. A triggering event may be based on the vehicle's speed and is triggered when the vehicle's speed approaches, 80% for example, the maximum allowed speed of the vehicle. Another triggering event may be based on a fault declared by the controller when, for example, the controller receives conflicting values from redundant subsystems.

In a further embodiment, any of the foregoing embodiments of a vehicle in accordance with the present invention may be provided with speed limiting to maintain balance and control, which may otherwise be lost if the wheels (arcuate elements, or other ground-contacting members) were permitted to reach the maximum speed of which they are currently capable of being driven.

Speed limiting may be accomplished by pitching the vehicle back in the direction opposite from the current direction of travel, which causes the vehicle to slow down. (As discussed above, the extent and direction of system lean determine the vehicle's acceleration.) In this embodiment, the vehicle is pitched back by adding a pitch modification to the inclinometer pitch value. Speed limiting occurs whenever the vehicle velocity of the vehicle exceeds a threshold that is the determined speed limit of the vehicle. The pitch modification is determined by looking at the difference between the vehicle velocity and the determined speed limit, integrated over time.

Alternatively, the headroom between a specified maximum power output and the current power output of the motors may be monitored. In response to the headroom falling below a specified limit, an alarm may be generated to warn the user to reduce the speed of the vehicle. The alarm may be audible, visual, or, alternatively the alarm may be tactile or may be provided by modulation of the motor drives, providing a 'rumbling' ride that is readily perceived by the user.

The automatic pitch modification sequence, in response to a detected speed at a specified speed limit, is maintained until the vehicle slows to the desired dropout speed (some speed slightly below the speed limit), and then the pitch angle is smoothly returned to its original value.

One method for determining the speed limit of the vehicle is to monitor the battery voltage, which is then used to estimate the maximum velocity the vehicle is currently capable of maintaining. Another method is to measure the voltages of the battery and the motor and to monitor the difference between the two; the difference provides an estimate of the amount of velocity margin (or 'headroom') currently available to the vehicle.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A vehicle for carrying a user, the vehicle comprising:
   a. ground-contacting module which supports a payload including the user, the ground-contacting module contacting an underlying surface and including at least one ground-contacting member;
   b. a motorized drive for actuating the at least one ground-contacting member so as to propel the vehicle in a normal mode of locomotion;
   c. a sensor for sensing a specified condition of the vehicle; and
   d. a controller for causing the vehicle, in response to the specified condition, to be accelerated with a vehicle acceleration modulated with a periodic modulation such that the vehicle acceleration alternates between braking and speeding up and braking over each period of the modulation.

2. A vehicle according to claim 1, wherein the ground-contacting module includes two laterally disposed wheels.

3. A vehicle according to claim 1, further including a control loop in which the motorized drive is included, for propelling the vehicle in a condition of dynamic balance with respect to tipping in the fore-aft plane.

4. A vehicle according to claim 3, wherein the controller provides an input to the control loop upon occurrence of a triggering condition, the input having a periodic factor.

5. A vehicle according to claim 4, the input further having a multiplicative coefficient.

6. A vehicle according to claim 4, the input contributing differentially to a torque applied to a left wheel and a torque applied to a right wheel.

7. A vehicle according to claim 4, the triggering condition including at least one of low battery power, a specified vehicle speed, and receipt by the controller of conflicting values from redundant subsystems.

\* \* \* \* \*